Nov. 28, 1950     H. POWELL     2,532,075
LIGHT HOLDER FOR CAMERAS
Filed April 17, 1946
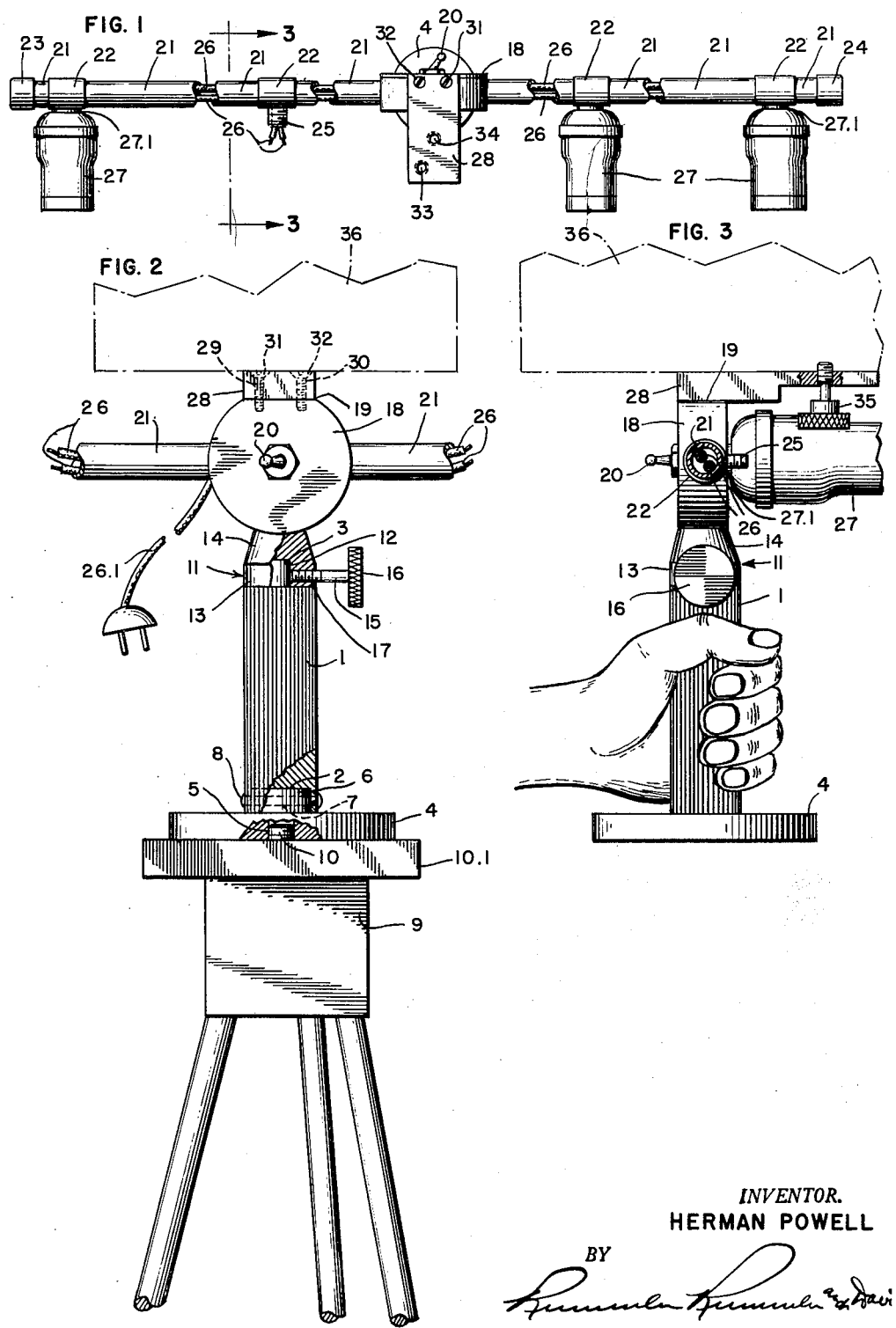
INVENTOR.
HERMAN POWELL
BY
ATTORNEYS Patented Nov. 28, 1950

2,532,075

UNITED STATES PATENT OFFICE 2,532,075

LIGHT HOLDER FOR CAMERAS

Herman Powell, Chicago, Ill., assignor to Columbia Enterprises, Grayslake, Ill., a corporation of Illinois Application April 17, 1946, Serial No. 662,750

1 Claim. (Cl. 240—1.3)

This invention relates to improvements in devices and more particularly to a bracket therefor on which a camera may be medially supported.

The main objects of this invention are to provide a device having artificial light incorporated therein and which will support either a movie or a still camera; to provide a device of this character wherein the direction of the light is controlled by the camera movement; to provide a device of this character wherein any change of position of the camera will automatically change the position of the illuminating equipment and retain it in the same general plane; to provide a device of this character having a detachable hand grip secured thereto whereby to make the device mobile; to provide a device of this character having a camera supporting platform secured medially of the light carrying bracket; to provide a device of this character having a switch housing with a snap switch contained therein; to provide a device of this character having a switch housing with conduits extending outwardly from either side thereof and in the same plane; to provide a device of this character having a switch which controls the turning on or off of all the lamp receiving sockets; to provide a device of this character having a support arm which supports the switch housing, conduit and camera supporting platform; to provide a device of this character having a support arm adapted to be secured to or removed from the hand grip; to provide a device of this character having a hand grip which is provided with a base plate having a threaded bore therein whereby the device may be secured to a tripod; to provide a device of this character which may easily be held in one hand when a camera is attached thereto; to provide a device of this character which may be rested on any flat surface; to provide a device of this character wherein all of the lamps may be turned on or extinguished simultaneously; to provide a device of this character which may be used in either a vertical or horizontal position or any position therein between; to provide a device of this character which is rotatable through 360° when mounted on a tripod; to provide a device of this character wherein the light carrying bracket and the camera supporting platform are rotatably mounted on the detachable handle; to provide a device of this character wherein all of the lamps are positioned in one plane on the light carrying bracket; and to provide a device of this character which is simple in construction and relatively inexpensive to manufacture.

Heretofore when a camera was used in conjunction with artificial light it was necessary to separately position the illuminating unit or units whenever the camera was moved in order to properly illuminate the subject being photographed. Such movement was cumbersome and time consuming, as many adjustments of the illuminating source had to be made to coincide with the camera position. When a moving picture was taken the illuminating problem was vastly increased as it was usually necessary to keep the camera in constant motion to cover the sequence of events properly. If the illuminating unit was fixed any movement of the camera or subject moved the illuminating source in effect, thereby constantly changing the shadow detail and produced a picture in which the light source appeared to be everything but constant. It was also found that whenever the lighting unit was fixed and either the camera or subject was moved, there was considerable danger present of over exposing or under exposing the film, thereby creating undesirable density variations in the films. When a still camera was used in place of a movie camera the same difficulties were present. It was to overcome these and other obvious defects that the present invention was conceived.

An illustrative embodiment of this invention is shown in the accompanying drawings in which:

Fig. 1 is a top plan view of my invention showing parts of the conduit broken away to show the wires contained therein.

Fig. 2 is a fragmentary rear elevational view showing the device positioned on a tripod.

Fig. 3 is a side elevational view taken on line 3—3 of Fig. 1 and showing the device held by hand, parts being shown in section.

Referring in detail to the drawings, the device as illustrated in the drawings comprises a hand grip having a base, a support arm rotatably secured to the upper end of the hand grip, a switch housing anchored to the support arm, a conduit supported by the switch housing, a plurality of lamp sockets extending from the conduit and at right angles thereto, and a platform secured to the support arm adapted to support a camera.

The hand grip comprising an elongated knurled casing 1, having a bore 2 contained in the lower end thereof, and an integrally formed cylindrical boss 3 medially positioned on and extending from the top end thereof. The hand grip is preferably formed of a light weight metal such as aluminum. An enlarged flat base 4, preferably circular in shape, and also preferably formed of aluminum or the like has an internally threaded bore 5 medially positioned in the bottom face thereof and has an integrally formed boss 6 medially positioned on the top face thereof. The boss 6 has a horizontally disposed bore 7 therethrough. The boss 6 is adapted to fit snugly in the bore 2, and is anchored therein in any suitable manner such as by a rivet 8 extending through suitable apertures contained in the casing 1 and the bore 7. It will be apparent from Fig. 2 of the drawings that the base 4 is adapted to seat on a tripod 9, and that the bore 5 will readily receive the securing stud 10 contained in the head 10.1 of all standard tripods. It will be equally apparent from Fig. 3 of the drawings that the base 4 is readily demountable from the tripod 9 and may be rested on any flat surface or that the casing 1 may be held by hand as illustrated.

The supporting arm or chuck comprises a solid metal post 11 of the same circumference as the case 1 and provided with a tapering neck 14. An axially extending bore 12 is located in the lower end of the post 11 and is adapted to snugly receive the boss 3, and be rotatable thereabout. A set screw 15 having a knurled head 16 is positioned in a suitable threaded aperture 17 in the post 11 and is adapted to anchor the post 11 to the boss 3 whereby to hold the post 11 immovably to the casing 1, or it may be left loosened so as to permit the post 11 to be freely rotated about the boss 3 a full 360°.

The switch housing 18, generally circular in shape, is provided with a flat top surface 19 and is integrally secured to the free end of the neck 14 of the post 11 in any suitable manner such as by welding or the like. A standard snap or toggle switch contained in the housing 18, has its trip or control lever 20 extending beyond the face of the back thereof in the usual manner. The lever 20 is connected in the usual manner to the hereinafter described electrical circuit, and is adapted to turn on or extinguish all the hereinafter mentioned lamps simultaneously.

The lamp supporting bracket comprises a plurality of connected conduit lengths 21 all communicating with the interior of the housing 18, extending in a longitudinal plane outwardly an equal distance from each side thereof, and are anchored thereto in any suitable manner such as by welding or threading. The conduit lengths 21 are secured together at equally spaced intervals by couplings 22, and are closed at their free ends by caps 23 and 24 respectively. The conduits 21 are of such length as to space the hereinafter described attached sockets an equal distance away from each side of the switch housing and an equal distance from each other, as is clearly illustrated in Fig. 1. Nipples 25 threaded into the suitable apertures contained in the couplings 22 and communicating with the interior of the conduits 21, extend forwardly therefrom in a relative horizontal plane which is transverse of the plane of the axis of the conduits and are adapted to receive the hereinafter described lamp sockets. Insulated electrical wires 26, of a gauge suitable for the described purpose, are contained in the conduit 21, are threaded through the nipples 25, and are electrically connected to the switch contained in the housing 18 in the usual manner and extend outwardly therefrom to a suitable source of supply. The extension cord 26.1 is also electrically connected to the switch. The cord should be of suitable length to accommodate use of the device when it is employed a distance away from the supply.

A plurality of lamp sockets 27 are provided with the usual internally threaded collars 27.1 which are adapted to be screwed onto the free extending ends of nipples 25 to anchor the sockets 27 to the conduit 21. Each of the sockets 27 are connected to the wires 26 in the usual manner and are all controlled collectively by the heretofore described switch. The sockets 27 all lie in a plane transverse to the plane of the conduits 21.

A flat platform 28 extends forwardly of the device as a whole and is provided with countersunk bores 29 and 30 in the rear end thereof whereby the platform is anchored to the surface 19 of the housing 18 by bolts 31 and 32 threaded through the apertures 29 and 30, respectively. The forward or free end of the platform is provided with a plurality of spaced apertures 33 and 34 adapted to receive a headed anchor bolt 35, of the type usually found on tripods, whereby a camera 36, equipped with a housing having internally threaded bores adapted to receive the anchor bolt 35, can be adjustably secured to the top surface of the platform 28.

To operate the device a camera 36 is secured to the platform 28 by the anchor bolt 35, lamps of the desired size are screwed into the sockets 27 and the cord 26.1 is connected to an electrical source. The device may be held in the hand as clearly illustrated in Fig. 3, or may be immovably secured to a tripod 9 as shown in Fig. 2. In either event the setscrew 15 may be tightened so as to bear against the boss 3, thereby securing the camera 36 and lights immovable to the casing 1, or the setscrew 15 may be loosened so as to allow the post 11 and consequently the camera 36 and lights to swing about the boss 3 a full 360°. I have found by experiment that as a general rule it is advisable to mount the device to a tripod when taking movies and loosen the setscrew 15, so as to allow the camera to follow any motion of the subject, and to remove the device from the tripod and tighten the setscrew 15 so as to prevent any movement of the post 11 on the casing 1 when taking still pictures.

It will be apparent from the foregoing description and the drawings, that as the camera 36 can be anchored to the platform 28, which is integrally secured to the post 11, and that as the post 11 can be firmly secured to the casing 1, that the device can be held in the hand either in the horizontal position shown in the drawings or may be held in a vertical position or in any position in between these two positions. It will also be equally apparent that no matter whether the device is held in the hand or is mounted on a tripod, movement of the camera in any direction will, automatically, direct the lights at the same target or object.

The advantages of this invention over the heretofore used methods of illuminating the photographic subject are numerous, among them are: The ability to direct the lights simultaneously and automatically in the direction in which the camera is aimed; maintaining a constant and unchanging source of illumination no matter in which direction the camera or subject moves; elimination of the objectionably heavy shadows always found when lamps are unequally spaced away from a subject; supplying a "flat" type of lighting generally desirable when taking moving pictures; furnishing a source of light emanating from substantially the same plane in which the camera lens lies; the ability to physically follow the subject, through a limited space, without changing the source of light, and thereby keeping the shadow details constant throughout the movement; the ability of turning on or extinguishing all light simultaneously thereby making easy "blackout" scenes or fully illuminated "flare-up" scenes, and the ability to turn the camera and illuminating unit simultaneously from left to right through 360° while mounted on a tripod or similar support.

It will be apparent from the nature of this invention that the lamps employed should be of the type usually employed in taking pictures, namely the kind having great brilliance and intensity. This type of lamp is to be distinguished from the "photoflash" lamp and the preferred type of lamp usually has a reflector "built in" the same.

Although one specific embodiment of this invention is herein shown and described it is to be understood that numerous details may be altered or omitted without departing from the spirit of the invention as defined by the following claims:

I claim:

In a device of the character described a camera platform; means on said platform for anchoring a camera thereto; a switch housing integrally secured to the underside of said platform; an electrical switch contained in said housing; a plurality of conduits; a plurality of couplings for connecting said conduits together to form a pair of unitary conduit lengths; each of said conduit lengths being secured at one end to opposite sides of said switch housing and extending laterally therefrom substantially horizontally and substantially parallel to the plane of said platform; lamp sockets integrally secured at equally spaced intervals to each of said couplings so as to be spaced equally away from said platform and with the axes of the sockets disposed substantially parallel to the plane of the platform; said sockets being electrically connected in series to said switch; a support arm integrally secured to the lower end of said housing; an axial bore in the lower end of said arm; a casing having an axially threaded bore in the lower end thereof and an axially extending boss on the upper end thereof; said arm bore adapted to receive said casing boss and said arm being rotatable thereabout together with said lamp sockets and said platform; a set screw positioned in said arm for immovably securing said arm to said casing when desired whereby manual movement of said casing will move said sockets and said platform in a corresponding direction; a flat circular base having an axially positioned threaded bore in the bottom surface thereof and an axial boss integrally secured to the top surface thereof; means for securing said base boss in said casing bore; said threaded bore adapted to receive a standard anchor bolt usually found in the head of a tripod whereby to anchor said casing immovably thereto.

HERMAN POWELL.

REFERENCES CITED

The following references are of record in the file of this patent:

UNITED STATES PATENTS

| Number | Name | Date |
| --- | --- | --- |
| D. 128,505 | Simpson | July 29, 1941 |
| 1,109,206 | Dexheimer et al. | Sept. 1, 1914 |
| 1,632,606 | King | June 14, 1927 |
| 1,977,378 | Doane | Oct. 16, 1934 |
| 2,213,749 | Strauss | Sept. 3, 1940 |
| 2,314,033 | Curran | Mar. 16, 1943 |
| 2,323,473 | Korling | July 6, 1943 |
| 2,403,892 | McFarlane et al. | July 9, 1946 |
| 2,418,067 | Carpenter | Mar. 25, 1947 |
| 2,423,282 | Aubey | July 1, 1947 |